United States Patent Office 3,761,440
Patented Sept. 25, 1973

3,761,440
PIGMENTED POLYCARBONATES WITH
IMPROVED PROPERTIES
Dieter Margotte and Hugo Vernaleken, Krefeld, and Günter Peilstöcker, Krefeld-Bochum, Germany, assignors to Bayer Aktiengesellschaft, Leverkusen, Germany
No Drawing. Continuation-in-part of abandoned application Ser. No. 134,863, Apr. 16, 1971. This application Aug. 27, 1971, Ser. No. 175,735
Claims priority, application Germany, Apr. 22, 1970, P 20 19 325.3; Feb. 5, 1971, P 21 05 487.5
Int. Cl. C08g 51/04, 51/08
U.S. Cl. 260—37 PC                                    10 Claims

ABSTRACT OF THE DISCLOSURE

Pigmented aromatic polycarbonates are provided which contain from about 5 to about 100 percent by weight relative to the weight of the pigment of copolymers containing epoxide groups or of a vinyl polymer free of epoxide groups.

---

This application is a continuation-in-part of copending application Ser. No. 134,863, filed Apr. 16, 1971, now abandoned.

Thermoplastic aromatic polycarbonates especially thermoplastic polycarbonates of di-(hydroxyphenyl)-alkanes, such as bisphenol A (2,2-di-(4'-hydroxyphenyl) propane) are distinguished by their good mechanical and thermal properties. In pigmented polycarbonates, or polycarbonates filled with carbon black, on the other hand, a more or less pronounced deterioration of certain properties is observed depending on the pigment used and the pigment concentration. This becomes particularly marked when the incorporation of the pigments, for example inorganic oxides, such as titanium dioxide, ironoxides chromium-(III)-oxide, sulphides, such as zinc sulphide and cadmium sulphide, or salts, such as barium sulphate, is carried out in the presence of small amounts of moisture which the polycarbonate absorbs through storage in air. This effect can for example also be observed in injection moulding of products already pigmented, and in processing regenerated material. The deterioration of the properties is presumably due to degradation reactions which can occur through interactions of the pigments and pigment surfaces with the polycarbonate in the melt in the presence of water. Further, it is possible that incompatibility phenomena between the pigment and polycarbonate manifest themselves, which also lead to a deterioration of the mechanical properties. Thus, for example, a molecular weight degradation is observed particularly clearly if polycarbonate is pigmented with 1.5 percent by weight of titanium dioxide and is processed into mouldings on injection moulding machines after it has absorbed 0.15 to 0.20 percent by weight of water.

The subject of the present invention are pigmented thermoplastic aromatic polycarbonates containing about 5 to about 100 percent by weight, relative to the pigment content, of polymers of olefinically unsaturated monomers, especially polymers of olefinically unsaturated monomers containing epoxide groups.

As a result of the additives according to the invention, the pigmented polycarbonates are largely stabilised against degradation when moist, so that it is possible to process even products which have not been completely dried, on injection moulding machines at temperatures of up to 350° C. The mechanical properties of the pigmented polycarbonates stabilised with the polymers containing epoxide groups are comparable with those of unpigmented polycarbonates; for example, the high notched impact strength remains fully preserved. Furthermore, a distinct improvement in colour density and colour brilliance can be detected even after having tempered the compositions of the invention at 130° C. for a long time. Finally, better compatibility between pigment and polycarbonate is achieved, which manifests itself, inter alia, by better distribution of the pigments in the polycarbonate.

Suitable polycarbonates for practising the invention are thermoplastic polycarbonates of aromatic dihydroxydes containing one or more benzene rings, especially of bisphenols, such as 4,4'-dihydroxydiphenyl, di-(hydroxyphenyl)-alkanes, -cycloalkanes, -ketones, -oxides, -sulfones. Preferred are the thermoplastic polycarbonates of bisphenol A which may be modified by incorporation of other bifunctional organic compounds such as bisphenol A, containing halogen atoms or alkyl groups, especially bromine, chlorine, or methyl groups as substituents in the benzene nuclei, aromatic dicarboxylic acids, aliphatic hydroxy compounds, furthermore aromatic compounds having one, three or more phenolic hydroxy groups. Further examples of such suitable compounds may be found in U.S. Pats. 3,028,365; 2,999,835; 3,148,172; 3,271,368; 2,970,131; 2,991,273; 3,271,367; 3,280,078; 3,014,891; 2,999,846.

PREPARATION OF A POLYCARBONATE

About 454 parts of 4,4'-dihydroxydiphenyl-2,2-propane and about 9.5 parts of p-tertiary-butylphenol are suspended in about 1.5 liters of water. In a three-neck flask equipped with agitation and a gas addition tube, oxygen is removed from the mixture by blowing nitrogen through it while agitating for about 15 minutes. Then about 355 parts of 45 percent sodium hydroxide and about 1,000 parts of methylene chloride are added. The mixture is cooled to about 25° C. While maintaining this temperature by cooling, about 237 parts of phosgene are added uniformly over about a 120 minute period. An additional about 75 parts each of a 45 percent sodium hydroxide solution are added after about 15 to 30 minutes respectively after the phosgene addition has begun. To the resulting solution, about 1.6 parts of triethyl amine are added and the mixture is agitated for an additional 15 minutes. A highly viscous solution is formed, the viscosity of which is adjusted by the addition of methylene chloride and the aqueous phase is separated. The organic phase is washed with water until free of salt and alkali. The polycarbonate is recovered from the washed solution and dried. The polycarbonate has a relative viscosity of 1.32 measured from a 0.5 percent solution of methylene chloride at 20° C., equivalent to approximately a 34,000 molecular weight product.

The ordinary pigments such as titanium dioxide, iron-oxides, chromium-(III)-oxide, cadmium sulphide, barium sulphate, calcium carbonate and/or carbon black and/or mixtures thereof can be incorporated in the polycarbonates with any desired concentration which is useful, preferably in amounts of 0.1–30%, especially 0.3–3% by weight based on the total weight of the composition of polycarbonate and pigment.

Suitable polymers used according to the invention for the stabilisation of the pigmented polycarbonates are polymers and copolymers of olefinically unsaturated monomers containing nitrile and/or ester groups such as homopolymers and copolymers of acrylonitrile, methacrylonitrile, derivatives of acrylic or methacrylic acid, such as esters of the said acids with aliphatic or cycloaliphatic alcohols having 1 to 6 carbon atoms, especially the methyl-, ethyl-, propyl-, butyl-esters; furthermore alkenyl-aromatic compounds, such as styrene, α-methylstyrene which are preferably used as comonomers for the production of copolymers with the other monomers.

A preferred class of polymers are copolymers of ethylenically unsaturated monomers which contain epoxide groups.

To manufacture these copolymers, the following monomers can for example be used as reaction partners for the vinyl monomers containing epoxide groups: olefines such as ethylene, propylene or isobutylene, aliphatic vinyl compounds such as vinyl chloride, vinylidene chloride, acrylic and methacrylic acid esters, amides and nitriles, vinyl acetate, vinyl propionate and vinyl benzoate, vinyl-methyl-ether, vinyl-ethyl-ether and vinyl-isobutyl-ether, and aromatic vinyl compounds such as styrene, α-methylstyrene, vinyltoluene, p-ethylstyrene, 2,4-dimethylstyrene, o-chlorostyrene and 2,5-dichlorostyrene.

Suitable vinyl monomers containing epoxide groups are, for example, glycidyl esters of unsaturated carboxylic acids (glycidyl methacrylate), glycidyl ethers of unsaturated alcohols (allyl-glycidyl-ether) and of alkenylphenols (isopropenylphenyl - glycidyl - ether), and vinyl and allyl esters of epoxycarboxylic acids (vinyl esters of epoxidised oleic acid). In general, all compounds which contain both a polymerisable unsaturated group and reactive epoxide groups in the molecule can be used for the manufacture of the copolymers. Copolymers of 5–30% (by weight) of glycidyl methacrylate, 20–60% of methyl methacrylate and 20–60% of styrene are particularly suitable.

The copolymers containing epoxide groups, which copolymers are obtained according to known processes, for example by a radical polymerisation in chlorobenzene at 80° C. in 50% strength solution, the molecular weights of which, do not have any significant influence on the properties of the pigmented polycarbonates, can lie between about 10,000 and about 200,000, preferably between about 40,000 and about 80,000, and which appropriately contain about 5 to about 500, preferably about 20 to about 200, epoxide groups per macromolecule, are appropriately used in amounts of about 5 to about 100 percent by weight, preferably in amounts of about 10 to about 30 percent by weight, relative to the pigment content. The same proportions and the same characteristics are valid for the polymers and copolymers which are devoid of epoxide groups.

(Co) POLYMERISATION OF UNSATURATED MONOMERS

The monomers, such as listed above, are solved in an appropriate solvent, such as benzene, chlorobenzene or toluene, and polymerized at a temperature of about 80° C. by adding azobisisobutyro nitrile whereby oxygen is excluded.

After the monomers having reacted, the solvent used, is distilled off (e.g. chlorobenzene at 100° C. and 20 torr) and the residue is dried in vacuum at 100° C. and then powdered. The resulting powder is useful as additive in the process of the invention.

The pigmented polycarbonates according to the invention can be manufactured in a manner which is in itself known, for example by the following processes; here, the methods of incorporation have no influence on the properties of the pigmented polycarbonates:

(1) By addition of the polymer, in powder form, to the pigment before incorporation of the pigments into the polycarbonate melt.

(2) By mixing the polymer, in solution, with the pigment. The pigments thus treated and encapsulated can, after evaporation of the solvent and drying, be incorporated in the polycarbonate.

(3) By addition of the polymer, to the polycarbonate, for example in solution or in the melt, and simultaneous or subsequent incorporation of the pigment.

(4) By the frequently used pigmentation of polycarbonates by mixing pigmented aromatic polycarbonates of higher pigment concentration (master batch) with unpigmented polycarbonates. In this case, the vinyl polymer, can be admixed during the manufacture of the master batch, or be admixed to the master batch during the pigmentation of the polycarbonate.

The polycarbonates containing pigments and being prepared by addition of polymers according to the invention can be used for shaped articles which are under high tensile and impact stress. By the improved colour brightness an additional publicity effect is given.

EXAMPLE 1

100 g. of titanium dioxide (rutile) are vigorously stirred for 30 minutes with 500 g. of methylene chloride. 30 g. (30 percent by weight, calculated relative to titanium dioxide) of a copolymer of 40 parts by weight of styrene, 40 parts by weight of methyl methacrylate and 20 parts by weight of glycidyl methacrylate as a 50 percent strength by weight solution in chlorobenzene are slowly added to this suspension. The mixture is then again stirred for 30 minutes. The solvents are distilled (100° C., 20 torr) from the titanium dioxide whilst stirring, the encapsulated pigment is dried and ground and mixed with polycarbonate granules from 4,4′-dihydroxydiphenylpropane-2,2 (bisphenol A), and the mixture is extruded from a mixing screw and injection moulded at 330° C. The titanium dioxide content is adjusted to 1.5 percent by weight, relative to polycarbonate.

EXAMPLE 2

90 g. of titanium dioxide are treated with 10 g. of a copolymer of 95 parts by weight of methacrylic acid methyl ester and 5 parts by weight of glycidyl methacrylate, as described in Example 1. The titanium dioxide thus encapsulated is mixed with polycarbonate from bisphenol A, as described in Example 1, and the mixture is extruded and injection moulded at 340° C. The titanium dioxide content is adjusted to 1.5 percent by weight, relative to polycarbonate.

EXAMPLE 3

640 g. of polycarbonate from bisphenol A are dissolved in 10 kg. of methylene chloride, and 300 g. of titanium dioxide and 120 g. of a copolymer of 30 parts by weight of glycidyl methacrylate and 70 parts by weight of methyl methacrylate as a 50% strength solution in chlorobenzene are added thereto. After adding a further 2 kg. of chlorobenzene, the methylene chloride is distilled off (100° C., 20 torr) whilst stirring, and the polymer mixture containing chlorobenzene gels. The gelled polycarbonate concentrate (master batch) is freed of the residual chlorobenzene by drying and is mixed with polycarbonate from bisphenol A, by means of an extruder at 360° C., in such a way that the pigmented material contains 1.5 percent by weight of titanium dioxide.

EXAMPLE 4

85 g. of titanium dioxide are treated with 15 g. of a copolymer of 85 parts by weight of styrene and 15 parts by weight of glycidyl methacrylate, as described in Example 1, and mixed with polycarbonate from bisphenol A in such a way that the pigmented polycarbonate contains 1.5 percent by weight of titanium dioxide.

EXAMPLE 5

Titanium dioxide is treated in accordance with Example 1, using a copolymer of 70 parts by weight of styrene and 30 parts by weight of isopropenylphenyl-glycidyl-ether instead of a copolymer of 40 parts by weight of styrene, 40 parts by weight of methyl methacrylate and 20 parts by weight of glycidyl methacrylate, and is mixed with polycarbonate from bisphenol A. The titanium dioxide content is adjusted to 1.5 percent by weight, relative to polycarbonate.

EXAMPLE 6

The concentrate manufactured in Example 3 (master batch) is mixed, in a twin-screw extruder, with polycarbonate granules from bisphenol A in such a way that the pigmented polycarbonate contains 0.5 percent by weight of titanium dioxide.

EXAMPLE 7

12 kg. of titanium dioxide are mixed in a mixer with 3 kg. of a powdered copolymer of 40 parts by weight of styrene, 40 parts by weight of methyl methacrylate and 20 parts by weight of glycidyl methacrylate for 30 minutes, and mixed with polycarbonate from bisphenol A, using a screw at 340° C., to give a 30% strength concentrate. This crude product is then mixed with polycarbonate from bisphenol A in an extruder so that the pigmented polycarbonate contains 0.5 percent by weight of titanium dioxide.

dioxide content is so adjusted that the pigmented material contains 1.5 percent by weight of pigment.

The mechanical properties (notched impact strength) as well as the relative viscosities of the pigmented polycarbonates manufactured according to Examples 1 to 10 are summarised in the table which follows:

|  | $N_{rel}$[1] of the test specimens | | Notched impact strength of the test specimens, kp./cm.[2] DIN 53453 | |
| --- | --- | --- | --- | --- |
|  | Injection moulded | | | |
|  | Dry | Moist[2] | Dry | Moist[2] |
| Polycarbonate from bisphenol A | 1.278 | 1.273 | 50 | 52 |
| Pigmented polycarbonate[3] (1.5% of titanium dioxide) | 1.245 | 1.232 | 24 | 2.5 |
| Example 1 (1.5% of titanium dioxide) | 1.273 | 1.273 | 50 | 55 |
| Example 2 (1.5% of titanium dioxide) | 1.274 | 1.270 | 49 | 51 |
| Example 3 (1.5% of titanium dioxide) | 1.273 | 1.271 | 52 | 50 |
| Example 4 (1.5% of titanium dioxide) | 1.269 | 1.270 | 45 | 44 |
| Example 5 (1.5% of titanium dioxide) | 1.276 | 1.272 | 48 | 50 |
| Pigmented polycarbonate[2] (0.5% of titanium dioxide) | 1.270 | 1.266 | 40 | 35 |
| Example 6 (0.5% of titanium dioxide) | 1.274 | 1.270 | 49 | 47 |
| Example 7 (0.5% of titanium dioxide) | 1.279 | 1.274 | 52 | 53 |
| Example 8 (0.5% of titanium dioxide) | 1.275 | 1.270 | 45 | 40 |
| Pigmented polycarbonate[3] (1% chrome oxide green) | 1.270 | 1.270 | 40 | 20 |
| Example 9 (1% chrome oxide green) | 1.274 | 1.275 | 50 | 40 |
| Pigmented polycarbonate according to Example 10 (1.5% titanium dioxide, without additive) | 1.270 | 1.268 | 10 | 3 |
| Example 10 (1.5% of titanium dioxide) | 1.276 | 1.274 | 13 | 8 |
| Pigmented polycarbonate according to Example 14 (2% CdS, without additive) | 1.261 | 1.245 | 9 | 4 |
| Example 14 (2% CdS) | 1.270 | 1.271 | 22 | 27 |
| Polycarbonate according to Example 15 (without pigment, without additive) | 1.290 | 1.271 | 14 | 12 |
| Pigment polycarbonate according to Example 15 (1% TiO₂, without additive) | 1.275 | 1.269 | 4 | 2 |
| Example 15 (1% TiO₂) | 1.291 | 1.293 | 10 | 12 |

[1] The relative viscosities were measured in methylene chloride at 25° C. and a concentration of 5 g. per 1,000 ml.
[2] The pigmented polycarbonate had a water content of 0.15–0.20%, corresponding to the water absorption at a relative atmospheric humidity of 60% at 25° C.
[3] The comparison sample was prepared in accordance with Example 1, but without using the copolymer, containing epoxide groups, according to the invention.

EXAMPLE 8

Titanium dioxide is treated in accordance with Example 7, using a copolymer of 80 parts by weight of methyl methacrylate and 20 parts by weight of allyl glycidyl-ether instead of a copolymer of 40 parts by weight of styrene, 40 parts by weight of methyl methacrylate and 20 parts by weight of glycidyl methacrylate. The pigmentation of the polycarbonate and the adjustment to 0.5 percent by weight of titanium dioxide content also is carried out as described in Example 7.

EXAMPLE 9

100 g. of chrome oxide green together with 30 g. of a copolymer of 40 parts by weight of styrene, 40 parts by weight of methyl methacrylate and 20 parts by weight of glycidyl methacrylate are suspended in 500 g. of methylene chloride, as described in Example 1. The solvent is distilled off, the encapsulated pigment is dried, ground and mixed with polycarbonate from bisphenol A, and the mixture is extruded on a twin-screw extruder and injection moulded at 330° C. The chrome oxide green content is adjusted to 1 percent by weight, relative to polycarbonate.

EXAMPLE 10

100 g. of titanium dioxide are suspended for 30 minutes in 500 g. of methylene chloride, as described in Example 1, and treated with 30 g. of a copolymer of 40 parts by weight of styrene, 40 parts by weight of methyl methacrylate and 20 parts by weight of glycidyl methacrylate as a 50% strength solution in chlorobenzene. The solvents are distilled off (100° C., 20 torr). The encapsulated pigment is dried, ground and mixed with co-polycarbonate from 70 mol percent of bisphenol A and 30 mol percent of tetrachlorobisphenol A, and the mixture is extruded from a mixing screw at 340° C. The titanium

EXAMPLE 11

100 g. of titanium dioxide (rutile) are vigorously stirred with 500 g. of methylene chloride for 30 minutes. 30 g. of a copolymer of 80 parts by weight of styrene and 20 parts by weight of acrylonitrile are added, as a 50% strength by weight solution in chlorobenzene, to this suspension. The whole is then again stirred for 30 minutes. Thereafter the solvents are distilled (100° C., 20 torr) from the titanium dioxide whilst stirring, the encapsulated pigment is dried and ground, and mixed with polycarbonate based on 4,4'-dihydroxydiphenylpropane (bisphenol A), and the mixture is extruded from a mixing screw and injection-moulded at 330° C.

EXAMPLE 12

12 kg. of titanium dioxide are intimately mixed, in a mixer, with 3 kg. of a finely ground vinyl polymer from methyl methacrylate, and mixed at 340° C., by means of a screw, with polycarbonate from bisphenol A, to give a 30% strength concentrate. This crude product is then mixed, in an extruder, with polycarbonate from bisphenol A, in such a way that the pigmented polycarbonate contains 1.5% by weight of titanium dioxide.

EXAMPLE 13

90 g. of titanium dioxide are treated, as described in Example 1, with 10 g. of a copolymer of 50 parts by weight of styrene, 30 parts by weight of ethyl acrylate and 20 parts by weight of acrylic acid. The titanium dioxide which has been encapsulated in this way is mixed with polycarbonate from bisphenol A, as described in Example 1, and the mixture is extruded and injection-moulded at 340°.

The relative viscosities after being injection-moulded dry and moist, the notched impact strengths (DIN 53,453), the relative lightness values Y (DIN 5033) and the spectral colour density $p_c$ (DIN 5033) are summarised in the table which follows.

EXAMPLE 14

98 g. of polycarbonate from 4,4'-dihydroxydiphenylpropane-2,2 are dissolved in 100 g. of methylene chloride. Whilst vigorously stirring there are added 2 g. of cadmium sulphide and 0.5 g. of a copolymer consisting of 40 parts by weight of styrene, 40 parts by weight of methyl methacrylate and 20 parts by weight of glycidyl methacrylate and 400 g. of chlorobenzene. Methylene chloride is then distilled off at a temperature of up to 100° C. Upon cooling of the hot polycarbonate solution. the polycarbonate gels and, after drying (24 hours at 120° C. and 10 mm. Hg), can be extruded and injection-moulded.

EXAMPLE 15

100 g. of titanium dioxide are suspended for 30 minutes in methylene chloride (as described in Example 1). 30 g. of polymethyl methacrylate are then added and the whole then stirred for a further half hour, before the solvent is distilled off at 80° C. and 10 mm. Hg. The encapsulated pigment is thereafter dried for 24 hours at 120° C. in the waterpump vacuum and ground. It is then mixed with a copolycarbonate from 50% mol of 4,4'-dihydroxydiphenylpropane-2,2'- (bisphenol A) and 50% mol of 4,4'-dihydroxy-3,3',5,5'-tetramethyl diphenylpropane-2,2 (tetramethylbisphenol A) and extruded at 330° C. The mixture is so adjusted that 1% of titanium dioxide is contained in the polycarbonate.

5. The pigmented polycarbonates of claim 1 wherein the copolymer is a copolymer of, by weight, 5 to 30% glycidyl methacrylate, 20 to 60% methyl methacrylate and 20 to 60% styrene.

6. The pigmented polycarbonate of claim 3 wherein the copolymer is a copolymer of the epoxide-containing monomer and a monomer selected from the group consisting of ethylene propylene, isobutylene, vinyl chloride, vinylidene chloride, acrylic acid esters, methacrylic acid esters, acrylic acid amides, methacrylic acid amides, acrylic acid nitriles, methacrylic acid nitriles, vinyl acetate, vinyl propionate, vinyl benzoate, vinyl-methyl-ether, vinyl-ethyl-ether, vinylisobutyl-ether, styrene α-methylstyrene, vinyltoluene, p-ethylstyrene, 2,4-dimethylstyrene, o-chlorostyrene and 2,5-dichlorostyrene.

7. The pigmented polycarbonate of claim 1 wherein the pigment is titanium dioxide an iron oxide, chrome oxide green, cadmium sulphide, barium sulphate, calcium carbonate and/or carbon black and/or mixtures thereof.

8. The pigmented polycarbonate of claim 1 wherein the polycarbonate is a 4,4'-di(hydroxyphenyl)-2,2-propane polycarbonate.

| | $\eta_{rel}$ [1] of the test specimens | | Notched impact strength of the test specimens, kp./cm.$^2$, according to DIN 53,453 | | Relative lightness value Y according to DIN 5033 | Spectral colour density $p_c$ according to DIN 5033 |
|---|---|---|---|---|---|---|
| | | | Injection moulded | | | |
| | Dry | Moist [2] | Dry | Moist [2] | | |
| Polycarbonate from bisphenol A | 1.298 | 1.288 | 50 | 45 | | |
| Pigmented copolycarbonate according to Example 10, but without additive | 1.270 | 1.268 | | | 73 | 12 |
| Example 10 | 1.276 | 1.274 | | | 80 | 8.2 |
| Pigmented polycarbonate [3] (1.5% by weight of titanium dioxide) | 1.245 | 1.232 | 18 | 4.5 | 74 | 12 |
| Example 11 (1.5% by weight of titanium dioxide) | 1.290 | 1.281 | 20.3 | 20.9 | 74.4 | 13 |
| Example 12 (1.5% by weight of titanium dioxide) | 1.292 | 1.288 | 20.9 | 23.8 | 78.0 | 9.7 |
| Example 13 (3.5% by weight of titanium dioxide) | 1.286 | 1.279 | | | 79.6 | 12 |

[1] The relative viscosites were measured in methylene chloride at 250° C. and a concentration of 5 g./1,000 ml.
[2] The pigmented polycarbonate contained 0.15–0.20% of water, corresponding to the water absorption at a relative atmospheric humidity of 60% at 25° C.
[3] The comparison sample was manufactured in accordance with Example 1, but without the use of the vinyl polymers according to the invention.

What is claimed is:

1. Pigmented aromatic polycarbonates containing 5 to 100 percent, based on the weight of the pigment, of a copolymer prepared by radical polymerization of an epoxide-containing, ethylenically unsaturated monomer; said copolymer having a molecular weight of from about 10,000 to 200,000 and containing from about 5 to 500 epoxide groups per macromolecule.

2. The pigmented polycarbonates of claim 1 wherein said pigment is present in an amount of from 0.1% to 30% by weight based on the total weight of the pigment and polycarbonate.

3. The pigmented polycarbonates of claim 1 wherein the copolymer is prepared from an epoxide-containing vinyl monomer selected from the group conisting of glycidyl esters of unsaturated carboxylic acids, glycidyl ethers of unsaturated alcohols, glycidyl ethers of alkenylphenols, vinyl esters of epoxycarboxylic acids and allyl esters of epoxycarboxylic acids.

4. The pigmented polycarbonates of claim 3 wherein the copolymer is a copolymer of the epoxide-containing vinyl monomer and a monomer selected from the group consisting of olefins, aliphatic vinyl compounds and aromatic vinyl compounds.

9. A process for stabilizing pigmented polycarbonates against the degradative effects of moisture comprising including in the pigmented polycarbonate 5 to 100 percent based on the weight of the pigment of a copolymer prepared by radical polymerization of an epoxide-containing vinyl monomer; said copolymer having a molecular weight of from about 10,000 to 200,000 and containing from about 5 to 500 epoxide groups per macromolecule.

10. The pigmented polycarbonate of claim 1 wherein the pigment is present in an amount of from 0.3 to 3% by weight based on the total weight of the polycarbonate and pigment.

References Cited
UNITED STATES PATENTS 3,437,631   4/1969   Cleveland ........ 260—37 PC
3,239,582   3/1966   Keskkula et al. ...... 260—873
3,130,177   4/1964   Grabowski .......... 260—873
3,431,224   3/1969   Goldblum ...... 260—37 PC X LEWIS T. JACOBS, Primary Examiner U.S. Cl. X.R.
260—41 R, 830 R